United States Patent
Brill

(10) Patent No.: US 10,042,069 B2
(45) Date of Patent: Aug. 7, 2018

(54) SYSTEMS, METHODS, AND COMPUTER-READABLE MEDIA FOR DETERMINING SHEAR-WAVE TO COMPRESSIONAL-WAVE VELOCITY RATIOS IN WELL CASINGS

(71) Applicant: SCHLUMBERGER TECHNOLOGY CORPORATION, Sugar Land, TX (US)

(72) Inventor: Thilo Michael Brill, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 150 days.

(21) Appl. No.: 15/270,518

(22) Filed: Sep. 20, 2016

(65) Prior Publication Data
US 2017/0090058 A1    Mar. 30, 2017

(30) Foreign Application Priority Data

Sep. 30, 2015 (EP) .................................... 15290252

(51) Int. Cl.
*G01V 1/40* (2006.01)
*G01V 1/50* (2006.01)
(Continued)

(52) U.S. Cl.
CPC ................ *G01V 1/50* (2013.01); *G10K 11/26* (2013.01); *E21B 47/0005* (2013.01); *G01V 1/40* (2013.01);
(Continued)

(58) Field of Classification Search
CPC ... G01V 1/50; G01V 1/40; G01V 1/44; E21B 47/0005
(Continued)

(56) References Cited

U.S. PATENT DOCUMENTS 3,496,533 A    2/1970  Semmalink
3,622,969 A *  11/1971 Lebreton ............... G01V 1/50
                                                  367/30
(Continued)

FOREIGN PATENT DOCUMENTS

WO    2015023384 A1    2/2015

OTHER PUBLICATIONS

Benoit Froelich: "Multimode evalutaion of cement behind steel pipe", The Journal of the Acoustical Society of America, vol. 123, No. 5, Jun. 29, 2008, p. 3648.
(Continued)

*Primary Examiner* — Ian J Lobo
(74) *Attorney, Agent, or Firm* — Michael Dae

(57) ABSTRACT

Systems, methods, and computer-readable media for determining shear-wave to compressional-wave velocity ratios in well casings are provided. A logging tool may include one or more acoustic phased arrays, such as one or more transmitter arrays and one or more receiver arrays each having multiple transducer elements. Peak pulse amplitudes may be calculated from received acoustic signals, and the group velocity of the peak mode may be calculated. The peak amplitude from measurements over a suitable incidence angle range may be used to determine the value of the shear-wave to compressional-wave velocity ratio.

20 Claims, 8 Drawing Sheets

(51) Int. Cl.
*G10K 11/26* (2006.01)
*E21B 47/00* (2012.01)

(52) U.S. Cl.
CPC .............. *G01V 2210/1299* (2013.01); *G01V 2210/1429* (2013.01); *G01V 2210/63* (2013.01)

(58) Field of Classification Search
USPC ................................ 367/28, 29, 35; 181/105
See application file for complete search history.

(56) References Cited

U.S. PATENT DOCUMENTS

| | | | | |
|---|---|---|---|---|
| 4,254,479 A | * | 3/1981 | Wiley | .................. G01V 1/50 175/50 |
| 2012/0069705 A1 | | 3/2012 | Zhao | |
| 2013/0155812 A1 | * | 6/2013 | Froelich | ............. E21B 47/0005 367/35 |
| 2014/0177389 A1 | * | 6/2014 | Bolshakov | .......... E21B 47/0005 367/35 |

OTHER PUBLICATIONS

Clorennec Dominique et al.: "Local and noncontact measurements of bulk acoustic wave velocities in thin isotropic plates and shells using zero group velocity lamb modes" Journal of applied physics, American Institute of physics, US, vol. 101, No. 3, Feb. 8, 2007, pp. 34908-034908.

Gao W. et al., "Laser Ultrasolic Study of Lamb Waves: Determination of the thinkness and volocities of a thin plate", International Journal of Engineering Science, Oxford, GB, vol. 41, No. 2, Jan. 1, 2003, pp. 219-228.

Grigsby T N et al., "Properties of Lamb Waves relevant to the ultrosonic inspection of thin plates", Transations of the IRE professional Group on Ultrasonicengineering, IEEE Inc. New York, US vol. UE-08, No. 1, Mar. 1, 1961, pp. 26-33.

Extended European Search Report issued in the related EP Application 15290252.4, dated Mar. 17, 2016.

* cited by examiner

SYSTEMS, METHODS, AND COMPUTER-READABLE MEDIA FOR DETERMINING SHEAR-WAVE TO COMPRESSIONAL-WAVE VELOCITY RATIOS IN WELL CASINGS

CROSS-REFERENCE TO RELATED APPLICATIONS

This application claims the benefit of European Patent Application No. 15290252.4, titled "Systems, Methods, and Computer-Readable Media for Determining Shear-Wave to Compressional-Wave Velocity Ratios in Well Casings", filed on Sep. 30, 2015, the entire content of which is incorporated by reference into the current application.

FIELD OF THE DISCLOSURE

The disclosure generally relates to evaluating annular material, and more particularly to determining shear-wave to compressional-wave velocity ratios in well casings.

BACKGROUND

When a well is drilled into a geological formation, logging tools are used to determine a variety of characteristics of the well. Some logging tools may determine characteristics of the surrounding rock formation. Other logging tools may measure characteristics of fluids, casing, and/or other material present in the well. Still other logging tools may determine when cement, resin, and/or the like has been properly installed in the well to achieve zonal isolation.

In certain cases, a logging tool may be configured to detect the presence and/or location of materials and/or fluids in a well, such as one or more annular fill materials behind the casing of a well. For example, cement may have distinguishable acoustic properties that may facilitate its detection by acoustic logging tools. However, the use of acoustic logging tools may result in a variety of wave modes being created in the materials and/or fluids, increasing interference and complexity in subsequent data analysis. Moreover, the interpretation of data may be dependent on the accuracy of parameters used in the analysis.

SUMMARY

A summary of certain embodiments disclosed herein is set forth below. It should be understood that these aspects are presented merely to provide the reader with a brief summary of these certain embodiments and that these embodiments are not intended to limit the scope of the systems and methods described herein. Indeed, embodiments of systems and methods described herein may encompass a variety of aspects that may not be set forth below.

In some embodiments, a method is provided. The method includes placing a logging tool into a cased well, the logging tool coupled to an array of acoustic transmitters and an array of acoustic receivers; and insonifying, by a first set of transmitters of the array of acoustic transmitters, a casing of the well with a plurality of acoustic signals, where the plurality of acoustic signals are emitted at respective angles relative to a normal of the casing. The method also includes receiving, by a first set of receivers of the array of acoustic receivers, respective reflection signals corresponding to the plurality of acoustic signals; and determining, by the logging tool, respective peak waveform amplitudes associated with the respective reflection signals. Additionally, the method includes determining, by the logging tool based at least in part on the respective peak amplitudes, a velocity ratio associated with a casing of the cased well. The velocity ratio includes a ratio of a shear-wave velocity associated with the casing to a compressional-wave velocity associated with the casing. The method also includes determining, by the logging tool based at least in part on the velocity ratio, parameter associated with the casing.

Additionally, in some embodiments, a non-transitory computer-readable medium storing computer-executable instructions is provided. When executed by at least one processor, the instructions cause the at least one processor to perform the following: insonifying, by a first set of transmitters of the array of acoustic transmitters, a casing of the well with a plurality of acoustic signals, where the plurality of acoustic signals are emitted at respective angles relative to a normal of the casing. Additionally, when executed by at least one processor, the instructions cause the at least one processor to perform the following: receiving, by a first set of receivers of the array of acoustic receivers, respective reflection signals corresponding to the plurality of acoustic signals; and determining, by the logging tool, respective peak waveform amplitudes associated with the respective reflection signals. Further, when executed by at least one processor, the instructions cause the at least one processor to perform the following: determining, by the logging tool based at least in part on the respective peak amplitudes, a velocity ratio associated with a casing of the cased well. The velocity ratio includes a ratio of a shear-wave velocity associated with the casing to a compressional-wave velocity associated with the casing. When executed by at least one processor, the instructions also cause the at least one processor to perform the following: determining, by the logging tool based at least in part on the velocity ratio, parameter associated with the casing.

Further, in some embodiments, a system is provided that includes a processor and a memory storing computer-readable instructions. When executed by at least one processor, the instructions cause the processor to perform the following: insonifying, by a first set of transmitters of the array of acoustic transmitters, a casing of the well with a plurality of acoustic signals, where the plurality of acoustic signals are emitted at respective angles relative to a normal of the casing. Additionally, when executed by the processor, the instructions cause the processor to perform the following: receiving, by a first set of receivers of the array of acoustic receivers, respective reflection signals corresponding to the plurality of acoustic signals; and determining, by the logging tool, respective peak waveform amplitudes associated with the respective reflection signals. Further, when executed by the processor, the instructions cause the processor to perform the following: determining, by the logging tool based at least in part on the respective peak amplitudes, a velocity ratio associated with a casing of the cased well. The velocity ratio includes a ratio of a shear-wave velocity associated with the casing to a compressional-wave velocity associated with the casing. When executed by the processor, the instructions also cause the processor to perform the following: determining, by the logging tool based at least in part on the velocity ratio, parameter associated with the casing.

Various refinements of the embodiments and features noted above may be made in relation to various aspects described herein. Further features may also be incorporated in these various aspects as well. These refinements and additional features may exist individually or in any combination. For instance, various features discussed below in relation to the illustrated embodiments may be incorporated into any of the above-described embodiments and/or aspects alone or in any combination. The brief summary presented above is intended just to familiarize the reader with certain aspects and contexts of embodiments described herein without limitation to the claimed subject matter.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Additionally, depending on the context, singular and plural terminology may be used interchangeably.

Figure 1A:
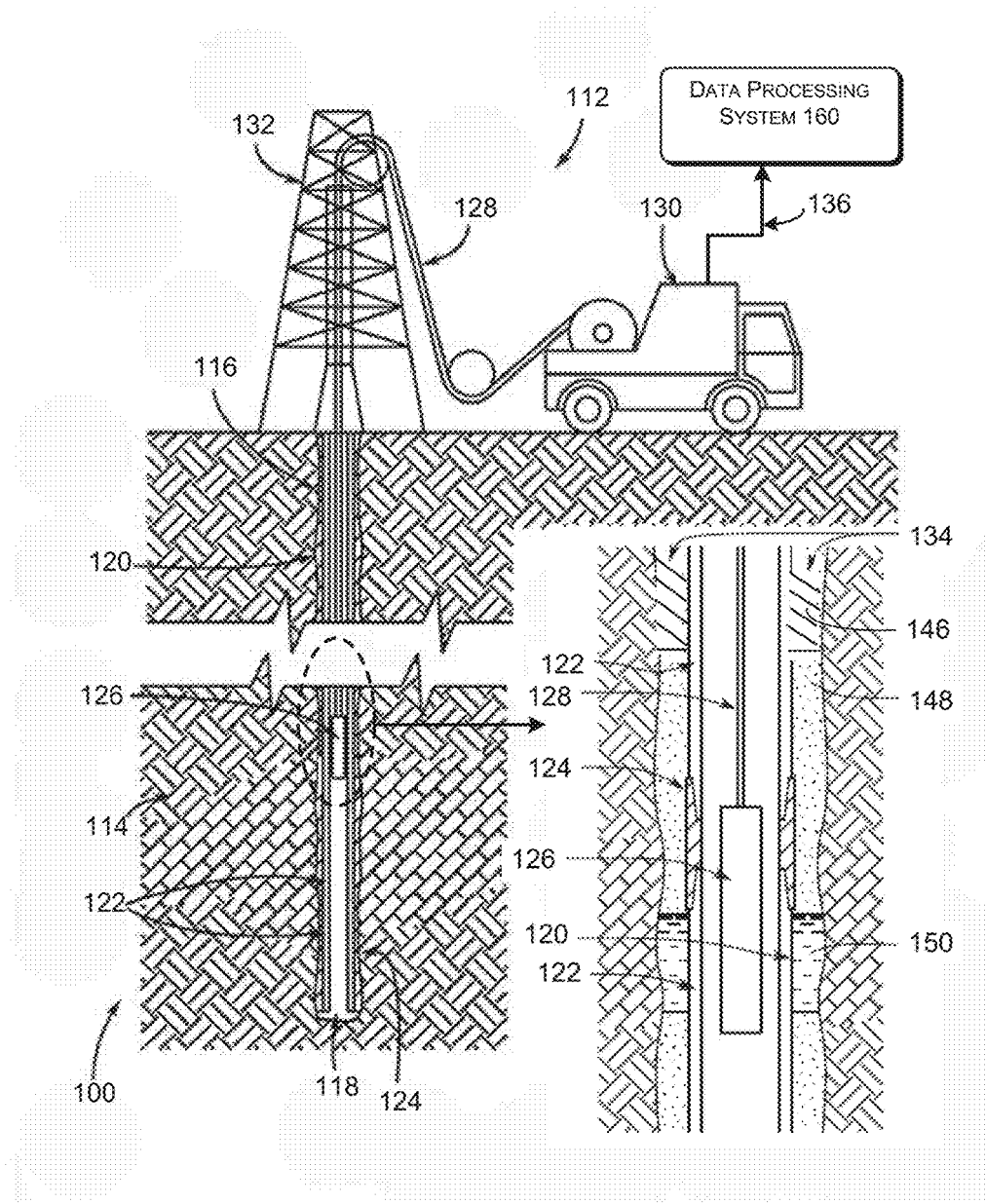
FIG. 1A is a schematic diagram of an example well logging system accordance with one or more example embodiments.

Certain implementations will now be described more fully below with reference to the accompanying drawings, in which various implementations, embodiments, and/or aspects are shown. However, various embodiments and aspects may be implemented in many different forms and should not be construed as limited to the implementations set forth herein; rather, these implementations are provided for thoroughness and completeness, and will fully convey the scope to those skilled in the art. Like numbers in the figures refer to like, but not necessarily the same or identical, elements throughout. Hence, if a feature is used across several drawings, the number used to identify the feature in the drawing where the feature first appeared will be used in later drawings.

DETAILED DESCRIPTION

Overview

Described herein are various implementations related to evaluating annular material using beamforming from acoustic arrays. In some embodiments, a logging tool may include one or more acoustic phased arrays, such as one or more transmitter arrays and one or more receiver arrays each having multiple transducer elements. Acoustic signals ("beams") emitted from one or more transmitter arrays and detected by one or more receiver arrays may be beamformed by independently pulsing the transducer elements of the arrays. The beamforming may include steering (e.g., selecting an angle) and focusing (e.g., collimating) of the acoustic signals. The acoustic signals may be beamformed to excite and detect desired wave modes (e.g., Lamb modes such as flexural modes, extensional modes, thickness modes) in a casing or other material in a well. In some embodiments, the acoustic impedance of the material may be characterized using pitch-catch measurements of the desired wave modes. In some embodiments, measuring a combination of wave modes may be used to determine parameters (e.g., elastic parameters) of material (e.g., mud, casing, cement, etc.) in the well. In some embodiments, pulse-echo measurements may be used to evaluate the casing cement and may provide a determination of casing thickness. In such embodiments, pulse-echo measurements may be used for the evaluation of casing corrosion.

In some embodiments, the incidence angles of emitted acoustic signals may be used to characterize elastic properties such as a shear-wave velocity to compressional-wave velocity ratio using flexural measurements. In such embodiments, a logging tool may include a transmitter array and two or more receiver arrays with transducer elements pulsed in the manner described above. Peak pulse amplitudes may be calculated using Hilbert transforms, and the group velocity of the peak mode may be calculated. In some embodiments, the peak amplitude from measurements over a suitable incidence angle range may be used to determine the value of the shear-wave to compressional-wave velocity ratio. In some embodiments, a plurality of angular scans at a minimum of two receiver array spacings and the associated group velocities from the distinct spacings may be used to determine the value of the shear-wave velocity to compressional-wave velocity ratio. In some embodiments, the peak amplitude and group velocity from pitch-catch measurements may be combined with normal incidence pulse-echo measurements to determine the value of the shear-wave velocity to compressional-wave velocity ratio.

These and other embodiments will be described in more detail through reference to the accompanying drawings in the detailed description that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Systems

When a well is drilled, a variety of logging tools may be used to determine characteristics of the well. These characteristics may include parameters of the surrounding geological formation, the shape and texture of the wellbore, or the quality of cement installation behind a casing, to name a few. When logging data is obtained in the well, a downhole logging tool may be moved through the well to obtain certain physical measurements. By processing these physical measurements, the characteristics of the well may be estimated. In the case of cement evaluation, for example, an acoustic logging tool may emit beams of acoustic energy against a casing of the wellbore and measure the acoustic waveforms that return. Because the returning waveforms vary depending on the quality of the cement installation behind the casing—varying, for example, on whether the material behind the casing has acoustic properties more like a liquid, gas, or solid—the returning waveforms can be used to ascertain properties of the casing and other materials, such as whether the material on the other side of the casing is a solid, and therefore, in at least one example, likely to be properly installed cement. In other examples, the corrosion in the casing or the casing thickness may be determined.

In view of the above, FIG. 1A schematically illustrates an example well-logging system 100 in accordance with one or more example embodiments. In particular, FIG. 1A illustrates surface equipment 112 above a geological formation 114. In the example of FIG. 1A, a drilling operation has previously been carried out to drill a wellbore 116, to run a casing string 118, and to seal an annulus 120—the space between the wellbore 116 and the casing string 118—with cementing operations.

The casing string 118 may include several casing joints 122 (also referred to below as casing 122) coupled together by casing collars 124 to stabilize the wellbore 116. The casing joints 122 represent lengths of conductive pipe, which may be formed from steel or similar materials. In one example, the casing joints 122 each may be approximately 13 meters or 40 feet long, and may include an externally threaded (male thread form) connection at each end. A corresponding internally threaded (female thread form) connection in the casing collars 124 may connect two nearby casing joints 122. Coupled in this way, the casing joints 122 may be assembled to form the casing string 118 to a suitable length and specification for the wellbore 116. The casing joints 122 and/or collars 124 may be made of carbon steel, stainless steel, or other suitable materials to withstand a variety of forces, such as collapse, burst, and tensile failure, as well as chemically aggressive fluid. It will be appreciated that as used herein, the casing string 118 may be of any suitable length, and may extend back to the surface of the wellbore 116, though in other implementations, the length of the casing string 118 may not extend back to the surface of the wellbore 116.

The logging tool 126 may be deployed inside the wellbore 116 by the surface equipment 112, which may include a vehicle 130 and a deploying system such as a drilling rig 132. Data related to the geological formation 114 or the wellbore 116 gathered by the logging tool 126 may be transmitted to the surface, and/or stored in the logging tool 126 for later processing and analysis. As will be discussed further below, the vehicle 130 may be fitted with or may communicate with a computer and software to perform data collection and analysis. The surface equipment 112 may carry out various well logging operations to detect corrosion and other conditions. The well logging operations may measure parameters of the geological formation 114 (e.g., resistivity or porosity) and/or the wellbore 116 (e.g., temperature, pressure, fluid type, or fluid flowrate).

As described above, some measurements may be obtained by a downhole logging tool 126, for which various embodiments are described herein. In certain embodiments, the logging tool 126 may be configured to emit and receive beamformed acoustic beams to excite and detect modes in materials in the wellbore 116. For example, in some embodiments Lamb modes may be excited in the casing joints 122. In some embodiments, shear waves, compressional waves, or both may be propagated in other media such as the annulus 120, the borehole fluid 118, and so on. In some embodiments, the acoustic measurements (e.g., pitch-catch measurements) may be used to characterize the acoustic impedance of material behind the casing. In some embodiments, measuring a combination of acoustic modes may be used to determine parameters (e.g., elastic parameters) of material (e.g., mud, casing, cement, etc.) in the wellbore 116. Such measurements may also be used to identify and determine the location and/or placement of the annular fill material in the annulus 120. Additionally, the example of FIG. 1A shows the logging tool 126 being conveyed through the wellbore 116 by a cable 128. Such a cable 128 may be a mechanical cable, an electrical cable, or an electro-optical cable that includes a fiber line protected against the harsh environment of the wellbore 116. In other examples, however, the logging tool 126 may be conveyed using any other suitable conveyance, such as coiled tubing or a borehole assembly (BHA) used for logging while drilling (LWD).

FIG. 1A also schematically illustrates a magnified view of a portion of the cased wellbore 116. As mentioned above, the logging tool 126 may obtain acoustic measurements relating to the excited and detected wave modes in materials in the wellbore 116. For instance, the logging tool 126 may obtain acoustic measurements associated with one or more portions of the annulus 120 (e.g., at different depths of the annulus). For example, as shown in FIG. 1A, the annulus 120 may include respective annulus portions 146, 148, and 150. To this end, the downhole logging tool 126 may be configured to determine respective measurements for each of the annulus portions 146, 148, and 150. Using these respective measurements, the data processing system 160 may be configured to identify or characterize at least one annular fill material 134 corresponding to the respective annulus portions 146, 148, and 150. Such measurements may be transmitted to the surface equipment 112. When the logging tool 126 provides such measurements to the surface equipment 112 (e.g., through the cable 128), the surface equipment 112 may pass the measurements as acoustic measurement data 136 and/or corresponding signals to a data processing system, such as 160 shown in FIG. 1B. In other examples, the acoustic measurement data 136 and/or corresponding signals may be processed by a similar data processing system, such as 160, at any other suitable location.

In some embodiments, the logging tool 126 may be used in an individual logging operation or in conjunction with various other tools in one or more logging operations. For instance, the logging tool 126 may be used with an acoustic cement evaluation tool, and the responses of the logging tool 126 and the acoustic tool may provide information relating to the presence of and/or characteristics of multiple types of annular fill material, such as cement, resins, conductive fluids, non-conductive fluids, or gases.

Figure 1B:
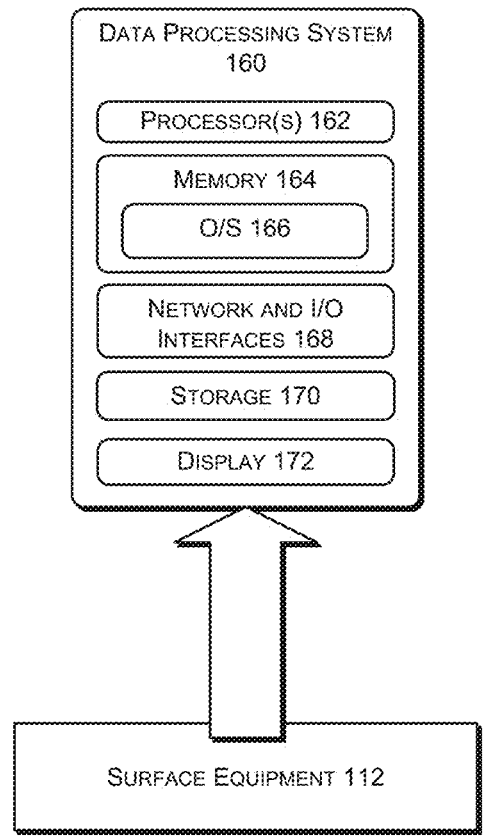
FIG. 1B is a block diagram of an example data processing system in accordance with one or more example embodiments.

Referring now to FIG. 1B, a block diagram of the data processing system 160 is illustrated in accordance with one or more example embodiments. The data processing system 160 may be configured to perform various operations using the logging data, such using acoustic measurements to characterize annular fill materials 134 (as shown in FIG. 1A) in the wellbore 116. Other operations may include, but are not limited to, executing testing applications, executing or performing simulations, reporting data, and conducting event forecasting and/or the like. As shown in FIG. 1B, the data processing system 160 may include one or more computer processors 162, a memory 164 storing an operating system (O/S) 166, network and input/output (I/O) interfaces 168, storage 170, and a display 172.

The one or more computer processors 162 may include one or more cores and may be configured to access and execute (at least in part) computer-readable instructions stored in the memory 164. The one or more computer processors 162 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The data processing system 160 may also include a chipset (not shown) for controlling communications between the one or more computer processors 162 and one or more of the other components of the data processing system 160. The one or more computer processors 162 may also include one or more application-specific integrated circuits (ASICs) or application-specific standard products (ASSPs) for handling specific data processing functions or tasks.

The memory 164 may include one or more computer-readable storage media (CRSM). In some embodiments, the memory 164 may include non-transitory media such as random access memory (RAM), flash RAM, magnetic media, optical media, solid state media, and so forth. The memory 164 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 164 may store an operating system 166 that includes a plurality of computer-executable instructions that may be implemented by the computer processor 162 to perform a variety of tasks to operate the interface(s) and any other hardware installed on the data processing system 160. The memory 164 may also store content that may be displayed by the data processing system 160 or transferred to other devices (e.g., headphones) to be displayed or played by the other devices. The memory 164 may also store content received from the other devices. The content from the other devices may be displayed, played, or used by the data processing system 160 to perform any tasks or operations that may be implemented by the computer processor 162 or other components in the data processing system 160.

The memory 164 may also include an operating system (O/S) 166, which may provide an interface between other application software executing on the same system and/or platform and hardware resources of the data processing system 160. More specifically, the operating system 166 may include a set of computer-executable instructions for managing hardware resources of the data processing system 160 and for providing common services to other application programs (e.g., managing memory allocation among various application programs). The operating system 166 may include any operating system now known or which may be developed in the future including, but not limited to, any consumer operating system, any server operating system, any mainframe operating system, or any other proprietary or freely available operating system.

The one or more network and I/O interfaces 168 may include one or more communication interfaces or network interface devices to provide for the transfer of data between the data processing system 160 and another device (e.g., network server) via one or more networks. The communication interfaces may include, but are not limited to: personal area networks (PANs), wired local area networks (LANs), wireless local area networks (WLANs), wireless wide area networks (WWANs), and so forth. The data processing system 160 may be coupled to the network via a wired or wireless connection. The communication interfaces may utilize acoustic, radio frequency, optical, or other signals to exchange data between the data processing system 160 and another device, such as an access point, a host computer, a server, a router, a reader device, and the like. The networks may include, but are not limited to, the Internet, a private network, a virtual private network, a wireless wide area network, a local area network, a metropolitan area network, a telephone network, and so forth.

The display 172 may include, but is not limited to, a liquid crystal display, a light-emitted diode display, or an electronic ink display. The display 172 may be used to show content to a user in the form of text, images, or video. In certain instances, the display 172 may also operate as a touch screen display that may enable the user to initiate commands or operations by touching the screen using certain finger or hand gestures.

Illustrative Logging Tool and Beamforming

Figure 2:
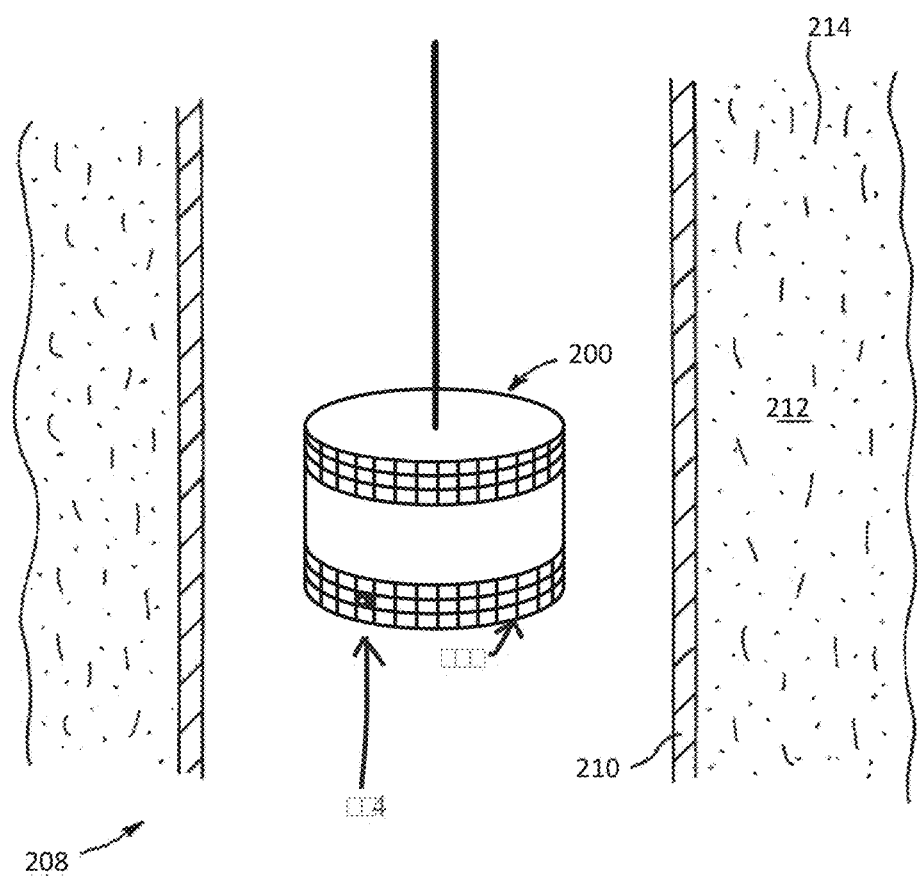
FIG. 2 is a schematic diagram of an example logging tool having an acoustic array in accordance with one or more example embodiments.

As previously mentioned, certain embodiments of the systems and methods described herein may facilitate evaluating annular material using beamforming from acoustic arrays. For instance, FIG. 2 depicts an example logging tool 200 that includes an acoustic array 202. The acoustic array 202 may include one or more transmitter/receiver (Tx/Rx) elements 204. To this end, it will be appreciated that each of the Tx/Rx elements 204 may be configured to function as acoustic transmitters and/or acoustic receivers. As shown in FIG. 2, the logging tool 200 is disposed in a wellbore 208. Also shown in the wellbore 208 is a casing 210 defining an annulus 212 filled with an annular fill material 214.

The acoustic array 202 may include one or more phased arrays (or, in some embodiments, sectors of arrays) having multiple transducer elements that may be pulsed independently. The phased arrays may provide for beamforming of acoustic pulses transmitted by the one or more phased arrays of transmitters and received by one or more phase arrays of receivers.

The logging tool 200 may be capable of performing pulse-echo measurements and pitch-catch measurements. For example, pitch-catch measurements may be used to excite and detect Lamb modes (e.g., flexural modes, extensional modes, thickness modes) in the casing to characterize the acoustic impedance of the material behind the casing. In some embodiments, measuring a combination of these modes may be used to determine parameters (e.g., elastic parameters) of material (e.g., mud, casing, cement, etc.) in the well. In some embodiments, pulse-echo measurements may be used to evaluate the casing cement by measuring acoustic impedance and may provide a determination of casing thickness. In such embodiments, pulse-echo measurements may be used for the evaluation of casing corrosion.

As suggested above, Lamb waves may be excited in the casing using the acoustic array 202. The dispersion relation of such Lamb waves may be a function of casing thickness and the elastic properties of the casing and surrounding medium (e.g., mud, cement, etc.). However, a pitch-catch measurement may excite multiple Lamb modes with different dispersion relations. As described further below, specific angles of acoustic beam incidence (via incidence angles) and beam collimation for both transmitting arrays and receiving arrays may be selected to excite and detect desired Lamb modes in the casing.

The individual elements of the phased array 202 may be pulsed independently, such that each element may be pulsed with an appropriately selected delay relative to a reference time zero. The superposition of the waves transmitted from the elements of the array may sum to create a wavefront shaped and directed (beamformed) using the selected delays. Beamforming may include the steering (e.g., selection of angle) and focusing (e.g., collimation) of the acoustic pulses transmitted from and detected by the phased array 202. In some embodiments, the collimation and direction (as identified by the acoustic angle) of the acoustic beam may be selected based on an excitation frequency, tube geometry (e.g., thickness, diameter, etc.), fluid properties, cement properties (e.g., attenuation, acoustic impedance, etc.), or any combination thereof. In some embodiments, the beamforming may be actively performed (e.g., in real-time) to track desirable measurement modes by using a feedback loop which affects the phased array delay timing and pulse spectrum. In this manner, desired measurement modes (e.g., desired Lamb modes) may be selectively excited and detected by beamforming the acoustic beams emitted from phased arrays of a logging tool 200.

In some embodiments, the spatial extent of the array along the tool axis and/or a division in multiple sections along and around the tool axis may provide for measurement and identification of received signals at variable transmitter-to-receiver (TX-TX) spacings. In such embodiments variable density log (VDL) type time-spacing plots may be measured. Group and phase velocities of observed waves (e.g., Lamb waves, specular and non-specular reflections, tool reflections, and third interface reflections from the formation or a second casing) may be uniquely identified from the plot. In such embodiments, the functionality of the logging tool 200 may be selected for selective interpretation of desired modes. In some embodiments, desired modes may be further selected by beam steering (e.g., selection of angle), including appropriate subsets of transmitter-receiver spacings, or any combination thereof. Further, in some embodiments, the VDL and beamforming measurement flexibility described above may provide for robust characterization of the state of the casing-cement bond or for the presence of microannuli (e.g., fluid microannuli) by identifying shear-wave related interface reflection modes.

In some embodiments, the phased array 202 may not cover an entire cylindrical surface surrounding the logging tool 200. In some embodiments, the phased array 202 may be a smaller array (or, in some embodiments, an array sector) disposed on a segment of the tool 200 (e.g., such as a pad or other eccentering structure) which rotates around the tool axis. In some embodiments, the logging tool 200 may include multiple array sectors which can rotate around the tool axis. In some embodiments, the disposition of the phased array 202 on a segment of a tool may reduce the overall array element number. In such embodiments, a smaller phased array may perform the beamforming (e.g., beam steering and collimation) described above. In such embodiments, a mounted pad with an array may have adjustable eccentering thus enabling the use of a single tool with multiple casing diameters via adjustment of a standoff or other mechanical feature.

In some embodiments, the interpretation of the acoustic measurement data may depend on the a priori knowledge of casing material parameters such as shear and compressional velocities. Inaccuracies in the assumptions of these casing material parameters may result in errors in the accuracy or validity of determinations, such as the acoustic impedance of cement. For example, the presence of corrosion-resistant casing (e.g., casings formed from austenitic steels with high chromium content). A casing material parameter of interest is the ratio (Vs/Vp) of shear-wave velocity (Vs) to compressional-wave velocity (Vp). For example, a low-carbon steel casing may exhibit a Vs/Vp ratio of about 0.55, while some austenitic steel casings may exhibit a Vs/Vp ratio of about 0.50. The sensitivity of the derived acoustic impedance inside the casing with respect to uncertainties in parameters such as density, shear-wave velocity, and compressional-wave velocity for a particular experimental geometry are compared below in Table 1:

| Parameter | Nominal | Change % | |ΔZerror|(MRayl) |
|---|---|---|---|
| Vs/Vp | 0.55 | ±1 | 0.18 |
| Vp | 5930 m/s | ±1 | 0.09 |
| Density | 7800 kg/m$^3$ | ±1 | 0.08 |

Figure 3A:
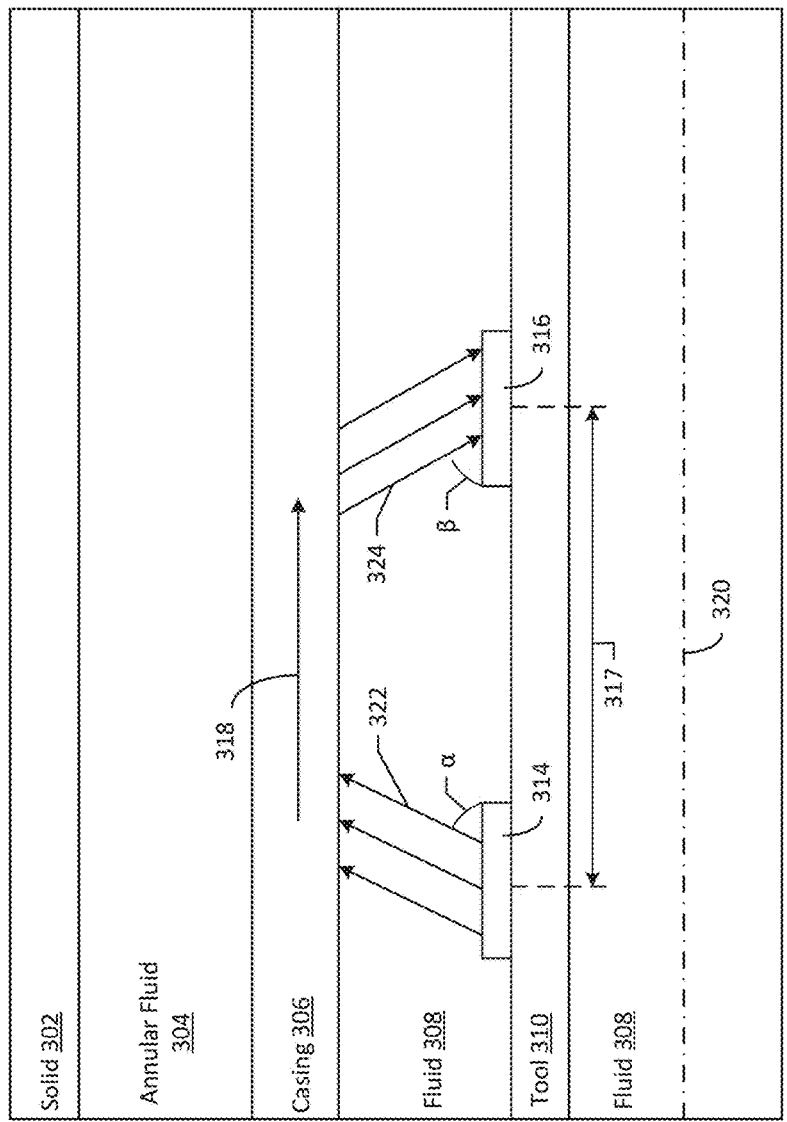
FIGS. 3A and 3B are schematic diagrams of example pitch-catch measurement geometries for flexural mode measurements in a casing surround by fluid in accordance with one or more example embodiments.

Thus, as shown in Table 1 above, the sensitivity to errors in the shear-wave velocity to compressional-wave velocity ratio (Vs/Vp) may dominate the acoustic impedance error balance as compared to errors of the shear-wave velocity or density alone. In some instances, errors of the acoustic impedance being the casing (e.g., cement) may be up to five times larger than for those inside the casing. Thus, in combination with potential errors of about 9% for the shear-wave velocity to compressional-wave velocity ratio (Vs/Vp), accuracy errors of more than 1.5 MRayl for the final cement acoustic impedance may be introduced Shear-Wave Velocity to Compressional-Wave Velocity Ratio Determinations and Pitch-Catch Measurement Geometry As described further below, the incidence angle of an acoustic beam may be used to characterize casing elastic properties such as shear-wave velocity to compressional wave velocity ratio (Vs/Vp). As described further below, the shear-wave velocity to compressional-wave velocity ratio (Vs/Vp) may be measured in situ based on flexural measurements using a logging tool. FIG. 3A depicts a schematic diagram of pitch-catch measurement geometry for a flexural mode measurement in a casing surround by fluid in accordance with an embodiment of the disclosure. FIG. 3A depicts, for example, a solid 302, an annular fluid 304, a casing 306, a fluid 308 inside the casing 306, and a tool 310 disposed inside the casing 306. FIG. 3A also depicts a transmitter array 314 and a receiver array 316 of the tool 310. The longitudinal axis 320 of the casing 306 is also depicted for reference. As shown in FIG. 3A, the transmitter array 314 and the receiver array 316 may be separated by a spacing 317.

As shown in FIG. 3A, the transmitter array 314 may emit an acoustic beam 322 at an angle α, and the receiver array 316 may receive an acoustic beam 324 at an angle β. The flexural mode propagation of the emitted acoustic beam 322 in the casing 306 at a velocity Vg is indicated by arrow 318. Other propagation routes (not shown) may also occur, such as specular reflection on the casing inner surface and possible third interface reflections from a medium behind the annular fluid. In some embodiments, the insonification via the transmitted acoustic beams 324 may be performed in a section of the well where the casing is surrounded by fluid on both sides.

As described above, the emission angle α of the acoustic beam 322 may be varied by suitable time-delays of the pulse subjected to each of the separate acoustic transducer elements of the transmitter array 314. Similarly, the receiver array 316 that converts the incoming acoustic beam 324 to an electric signal may be directionally selective via appropriate time-gating.

The emission angle α and the reception angle β may be varied over a suitable range of incidence angles, and the received waveforms w(α, β, t) as a function of emission angle, reception angle, and time may be identified and evaluated. The obtained waveform signals may be filtered, digitized, recorded, and then transmitted to a processing system (e.g., data processing unit 160). In some embodiments, identification emission angles α and reception angles β may be used such that α=β and the evaluated waveforms may thus be w(α, α, t)=w(α, t). The range of incidence angles may depend on the acoustic parameters of the media, such as the fluid inside the casing. In some embodiments, the emission angle α may be at least about 20° up to at least about 45°.

In some embodiments, multiple transmitter array to receive array spacings may be used. In some embodiments, pulse parameters such as bandwidth and central firing frequency may be adapted to the geometry and the specific transmitter array. In such embodiments, multiple spacings, frequencies, or combinations thereof may be used to mitigate complications in the data inversion due to the presence of other propagating modes, such as the extensional guided Lamb wave mode, the specular and non-specular reflections, and the third interface reflections.

Figure 3B:
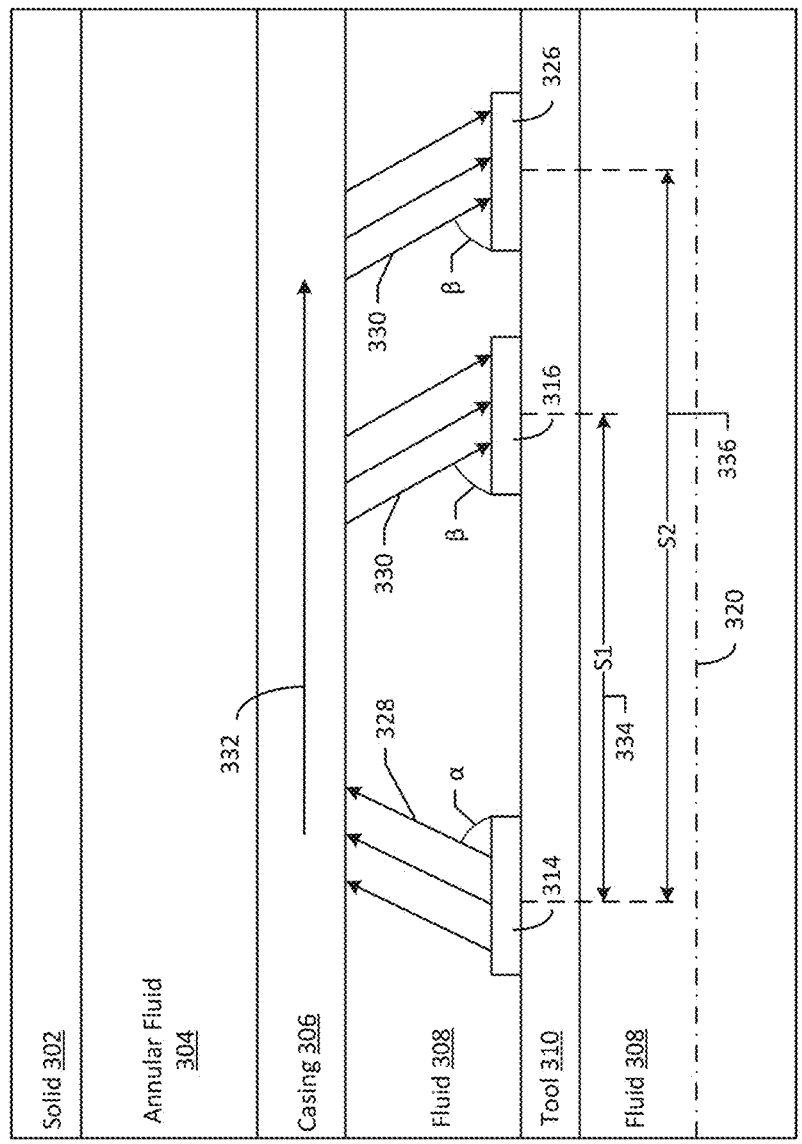

FIG. 3B depicts the schematic diagram of FIG. 3A for a tool 310 having a second receiver array 326 in accordance with another embodiment of the disclosure. The transmitter array 314 may emit an acoustic beam 328 at an angle α, and the receiver arrays 316 and 326 may receive an acoustic beam 330 at an angle β. The flexural mode propagation of the emitted acoustic beam 322 in the casing 306 at a velocity Vg is indicated by arrow 332. Other propagation routes (not shown) may also occur, such as specular reflection on the casing inner surface and possible third interface reflections from a medium behind the annular fluid. In some embodiments, the insonification via the transmitted acoustic beams 328 may be performed in a section of the well where the casing is surrounded by fluid on both sides.

FIG. 3B also depicts the spacings between the transmitter array 314 and the receiver arrays 316 and 326. For example, FIG. 3B depicts the spacing 334 (S1) between the transmitter array 314 and the receiver array 316 and the spacing 336 (S2) between the transmitter array 314 and the receiver array 326 are depicted in FIG. 3B.

The emission angle α of the acoustic beam 328 and the reception angle β may be varied over a suitable range of incidence angles, as described above. Here again, the received waveforms w (α, β, t) as a function of emission angle, reception angle, and time may be identified and evaluated. The obtained waveform signals may be filtered, digitized, recorded, and then transmitted to a processing system (e.g., data processing unit 160). As also noted above, in some embodiments, identification emission angles α and reception angles β may be used such that α=β and the evaluated waveforms may thus be w (α, α, t)=w (α, t). The range of incidence angles may depend on the acoustic parameters of the media, such as the fluid inside the casing. In some embodiments, the emission angle α may be at least about 20° up to at least about 45°.

After recording the waveforms w(α, t), the peak pulse amplitudes p(α) for the recorded waveforms w(α, t) may be calculated by finding the maximum magnitude of the Hilbert transform of each w(α, t) using Equation 1 below:

$$p(\alpha) = \max(abs(\text{Hilbert}(w(\alpha,t)))) \quad (1)$$

Where, α is the incidence angle, p(α) is the peak pulse amplitude and w(α, t) is the recorded waveforms at angle α and time t.

In some embodiments, the calculation may be performed using a 2D model using a complex-transducer point (CTP) description of Gaussian beams. The Hilbert transform magnitude may correspond to the flexural mode propagating in the casing with relatively little dispersion.

Accordingly, the relative attenuation in dB may be calculated using the peaks of the Hilbert transform magnitude, as shown below in Equation 2:

$$att(\alpha) = -20\log_{10}\left(\frac{p(\alpha, S2)}{p(\alpha, S1)}\right) \quad (2)$$

Where att(α) is the relative attenuation, p is the peak pulse amplitude, and S1 and S2 are spacings for a first receiver array and a second receiver array respectively.

The group velocity Vg of the peak mode may be calculating using Equation 3 below:

$$Vg(\alpha) = \frac{(S2 - S1)}{(t(\alpha, S2) - t(\alpha, S1))} \quad (3)$$

Where t(α,Si) is the time of the peak for a given spacing Si and angle α.

Figure 4:
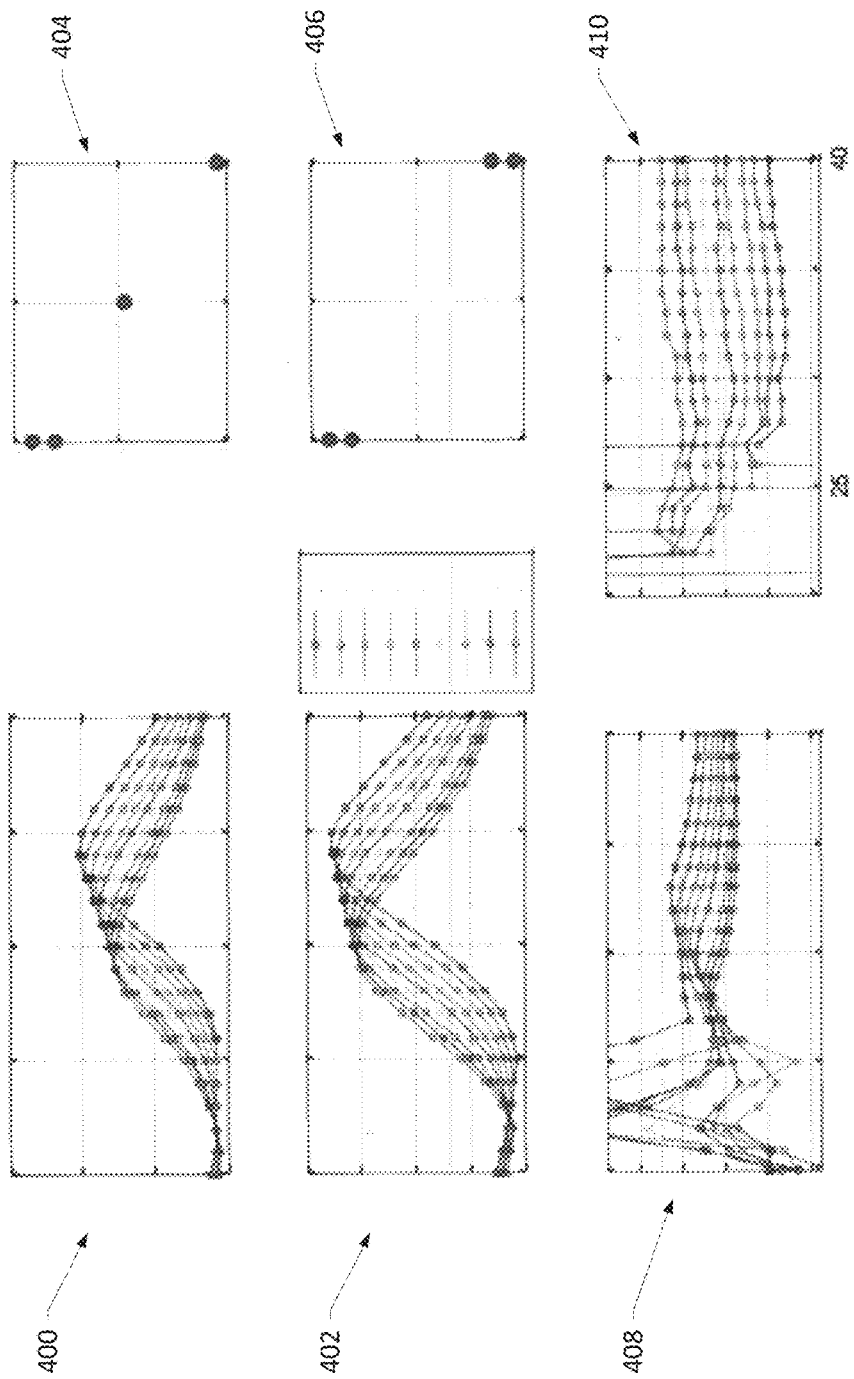
FIG. 4 depicts plots illustrating peak Hilbert transform magnitudes, shear-wave velocity to compressional-wave ratios, and relative attenuations in accordance with one or more example embodiments.

FIG. 4 depicts various plots illustrating parameters for illustrating peak Hilbert transform magnitudes, shear-wave velocity to compressional-wave velocity ratios, and relative attenuations determined in accordance with the techniques described above. For example, plots 400 and 402 show the waveforms' peak Hilbert transform magnitudes versus incidence scanning angle for two spacings, respectively. The plots 404 and 406 show the ratio Vs/Vp versus the peak m (Si, Vs/Vp) with an angular resolution of Δα=1° for each of the two spacings. The plots 408 and 410 depict the relative attenuations of the waveform peaks and group velocities respectively of the mode versus all angles and velocity ratios.

As shown in FIG. 4, the peak pulse amplitudes as a function of incidence angle, p(α), exhibit a maximum for a spacing Si and Vs/Vp ratio, as shown below by Equation 4:

$$m(Si, Vs/Vp) = \max(p(\alpha, \{Si, Vs/Vp\})) \text{ at } \alpha = \alpha_{max}(Si, Vs/Vp) \quad (4)$$

Where m(Si,Vs/Vp) is a maximum for a spacing Si and Vs/Vp ratio.

The maximum incidence angles $\alpha_{max}$(Si, Vs/Vp) exhibit a nearly linear dependence versus Vs/Vp with a sensitivity given by the slope of Vs/Vp versus $\alpha_{max}$(Si, Vs/Vp), as shown below by Equation 5:

$$S\alpha_{max} = \left|\frac{\partial(Vs/Vp)}{\partial \alpha_{max}(Si, Vs/Vp)}\right| \approx 0.02 \text{ deg}^{-1} \quad (5)$$

Where $S\alpha_{max}$ is the sensitivity at maximum incidence angles. The sensitivity may also be shown as a percent change of Vs/Vp versus α: $S\alpha_{max}\% = 3.7\%$ deg$^{-1}$.

Shear-Wave Velocity to Compressional-Wave Velocity Ratio Determination Using Peak Amplitude Over Incidence Angle Range In some embodiments, the peak amplitude from measurements covering a suitable incidence angle scanning range may be used to determine the value of the Vs/Vp ratio. Such embodiments may assume that the relevant fluid properties (e.g., density and compressional-wave velocity), casing density, and compressional-wave velocity Vp, and the geometric parameters such as casing thickness are a priori known. As shown above, the relative accuracy of the determination of the Vs/Vp ratio may be estimated as 3.7% for an angular accuracy of 1°. The relative accuracy is sufficient to distinguish an austenitic chromium steel casing from a low-carbon steel casing. In other embodiments the determination of the Vs/Vp ratio may be derived from the maximum partial derivative of the data sets $\partial p(\alpha, \{Si, Vs/Vp\})/\partial \alpha$ versus $\alpha$.

With at least two transmitter-to-receiver spacings (e.g., as shown in FIG. 3B and described above)t, the value of the flexural mode group velocity Vg, described above in Equation 3, may be used to improve the determination of Vs/Vp, as shown below in Equation 6:

$$Vg(\alpha, Vs/Vp) = \frac{(S2 - S1)}{(t(\alpha, S2, Vs/Vp) - t(\alpha, S1, Vs/Vp))} \quad (6)$$

In some other embodiments, the determination of the group velocity $Vg(\alpha, Vs/Vp)$ may be based on the wavefront arrival times at the individual elements of a given receiver array.

As shown in FIG. 4, the variation of $Vg(\alpha, Vs/Vp)$ versus Vs/Vp is characterized by a relative sensitivity shown below in Equation 7:

$$SVg = \left| \frac{\partial (Vs/Vp)}{\partial Vg(\alpha, Vs/Vp)} \right| \approx 1.79 \cdot 10^{-4} \text{ s/m} \quad (7)$$

For example, using Equation 7, a change of Vs/Vp by 1% leads to a change in $Vg(\alpha, Vs/Vp)$ by 1% for group velocities Vg~3200 m/s and Vs/Vp~0.55.

It should be appreciated that the techniques described above may be performed for a range of geometries and fluids, such as different casing thicknesses. The angular domain of the peak amplitudes m(Si,Vs/Vp) and the range of group velocities $Vg(\alpha, Vs/Vp)$ may be minimally affected by changes in casing thickness. Thus, the techniques described above do not necessarily use an accurate a priori knowledge of the casing thickness. For example, Table 2 below depicts calculate relative sensitivities of the Vs/Vp ratio with respect to the peak angle $S\alpha_{max}$ or the group velocity Vg for different casing thicknesses:

| Thickness (mm) | $S\alpha_{max}$ (% deg$^{-1}$) | SVg (%/%) |
|---|---|---|
| 8 | 4.0 | 1.0 |
| 16 | 3.2 | 0.9 |
| 20 | 3.2 | 0.9 |
| 25.4 | 3.2 | 0.9 |

The location of the peak amplitudes m(Si,Vs/Vp) may depend on the fluid properties, such as fluid density. For example, Table 3 below depicts calculated relative sensitivities of the Vs/Vp ratio with respect to the peak angle $S\alpha_{max}$ or the group velocity Vg for five different fluids surrounding the casing:

| Fluid | Density (kg/m$^3$) | Velocity (m/s) | $S\alpha_{max}$ (% deg$^{-1}$) | SVg (%/%) |
|---|---|---|---|---|
| Water | 1000 | 1500 | 4.0 | 1.0 |
| Diesel | 850 | 1380 | 4.0 | 1.0 |
| Brine 11 ppg | 1320 | 1760 | 1.3 | 0.8 |
| SOBM 18 ppg | 2160 | 1100 | 5.4 | 1.1 |
| WBM 18 ppg | 2160 | 1500 | 3.2 | 1.1 |

As shown in Table 3, the sensitivities to Vs/Vp ratio determinations from the peak angle or the group velocity are comparable for each fluid (except the 11 ppg brine). Thus, the interpretation of the flexural mode measurements of Vs/Vp and Vg may account for the different fluid properties in an appropriate forward model. In some embodiments, the interpretation may be based on an optimization of parameters using a minimization algorithm.

Shear-Wave Velocity to Compressional-Wave Velocity Ratio Determination Using a Plurality of Angular Scans and Associated Group Velocities In another embodiment, a plurality of angular scans $p(\alpha, Si)$ at a minimum of two spacings Si and the associated group velocities $Vg(\alpha, Si, Sj)$ from distinct spacings Si and Sj may be used to estimate the Vs/Vp ratio. In some embodiments, the distinct spacings Si and Sj may be a part of the same receiver array. A vectorial prediction function G may be calculated for the measured quantities using a forward model for the desired parameter range. For embodiments having two spacings, the vectorial prediction function G may be illustrated by Equation 8 below:

$$[G_1, G_2, \ldots G_{3n}] = G(Vs/Vp,$$

$$[p(\alpha_1, S1), p(\alpha_2, S1), \ldots p(\alpha_n, S1)$$

$$p(\alpha_1, S2), p(\alpha_2, S2), \ldots p(\alpha_n, S2),$$

$$Vg_1(\alpha_1, S1, S2), Vg_1(\alpha_2, S1, S2), \ldots Vg_1(\alpha_n, S1, S2)]) \quad (8)$$

Where G is the vectorial prediction function, n is the number of angular measurements of $p(\alpha, Sj)$ and $Vg_1(\alpha_j, S1, S2)$, the index k=1 of $Vg_k$ quantifies the set of distinct spacings used to calculate Vg, and the index $3n$ of $G_{3n}$ is the resulting number of measured quantities for this case. The prediction function G may be a function of the casing shear velocity to compressional-wave velocity ratio Vs/Vp, the incident angles $\alpha$ and $\beta$ (which, for some embodiments, may be equal), control parameters such as the compressional-wave velocity Vp, the fluid acoustic properties (e.g., density and velocity), the casing thickness, and casing density. In such embodiments, additional a priori known model control variables may include the transducer pulse parameters such as bandwidth, central firing frequency, transducer geometry, and transducer position. The number of elements of the vectorial prediction function G may increase with additional spacings and possible combinations.

A minimization algorithm may be applied to the vectorial prediction function G and the measurements $p(\alpha_i, Sj)$ and $Vg(\alpha_n, S1, S2)$. The objective of the minimization function is to find the closest correspondence between the measurements and the function G by an appropriate choice of the Vs/Vp ratio, as shown below by Equation 9:

$$\text{Min}_{(Vs/Vp)} \ast \|[M_1, M_2, \ldots M_{3n}] - [G_1, G_2, \ldots G_{3n}]\|^2 < \varepsilon \quad (9)$$

Where ε>0 is a sufficiently small value of tolerance and M is the vector of measured quantities described by Equation 10 below:

$$M=[p(\alpha_1,S1),p(\alpha_2,S1), \ldots p(\alpha_n,S1)$$

$$p(\alpha_1,S2),p(\alpha_2,S2), \ldots p(\alpha_n,S2),$$

$$Vg_1(\alpha_1,S1,S2),Vg_1(\alpha_2,S1,S2), \ldots Vg_1(\alpha_n,S1,S2)] \quad (10)$$

In other embodiments, the minimization algorithm may be other suitable known minimization algorithms.

As mentioned above, the casing compressional-wave velocity Vp may affect the accuracy of pulse-echo measurement techniques. The calculated sensitivities of the Vs/Vp ratio with respect to the peak angle $S_{\alpha max}$ or the group velocity Vg for different casing compressional velocities Vp is shown below in Table 4:

| Vp/Vp$_0$ | Vp (m/s) | S$\alpha_{max}$ (% deg$^{-1}$) | SVg (%/%) |
|---|---|---|---|
| 0.95 | 5633.5 | 3.2 | 1.0 |
| 0.99 | 5870.7 | 3.2 | 1.0 |
| 1 | 5930.0 | 4.0 | 1.0 |
| 1.01 | 5989.3 | 3.2 | 1.0 |
| 1.05 | 6226.5 | 4.0 | 1.0 |

As shown in Table 4, the sensitivity of the Vs/Vp ratio and the group velocity Vg is may not be substantially affected by a change in casing compressional-wave velocity Vp up to ±5% around the nominal value of a low carbon steel material.

However, the angular domain of the peak amplitudes m(Si, Vs/Vp) and the range of group velocities Vg(α,Vs/Vp) are affected by the value of Vp. If fluid density and velocity as well as casing compressional-wave velocity may be estimated, more measurements such as additional spacings may be added to the flexural scanning method described herein.

Shear-Wave Velocity to Compressional-Wave Velocity Ratio Determination Using Peak Amplitude and Group Velocity Pitch-Catch Measurements with Pulse-Echo Measurements In some embodiments a combined interpretation with a known pulse-echo measurement technique, such as pulse-echo measurements obtained with a separate device, may be used. In another embodiment, the measurements p(α$_i$,Sj) and Vg(α$_n$, S1,S2) from a pitch-catch measurement as described above may be combined with a normal incidence (i.e., α=0) pulse-echo technique. In such embodiments, the additional pulse-echo measurements may include the casing resonance frequency f0 and the resonance quality factor Q=f0/Δf, where f0 corresponds to the frequency of reverberations inside the casing and Δf characterizes the bandwidth of the resonance.

For a one-dimensional example, the resonance frequency f0 may be a function of casing thickness d and compressional-wave velocity Vp, and may be calculated according to Equation 11 below:

$$f0 = \frac{Vp}{2d} \quad (11)$$

Where f0 is the resonance frequency, Vp is the compressional-wave velocity, and d is the casing thickness.

For a three-dimensional instance, the added pulse-echo measurement may provide additional constraints to a minimization. Additionally, the quality factor Q of the resonance may be a function of the fluid density ρ$_f$ and fluid velocity V$_f$ surrounding the casing. A forward model may be used to predict the specific values of f0 and Q as a function of geometrical and material parameters.

Accordingly, a combined vectorial prediction function H may be calculated for the measured quantiles using forward models for the desired parameter range, as illustrated in Equation 12 below:

$$[H_1,H_2, \ldots H_{3n+2}]=G(Vs/Vp,Vp,D,\{\rho_f,V_f\},$$

$$[p(\alpha_1,S1),p(\alpha_2,S1), \ldots p(\alpha_n,S1)$$

$$p(\alpha_1,S2),p(\alpha_2,S2), \ldots p(\alpha_n,S2),$$

$$Vg_1(\alpha_1,S1,S2),Vg_1(\alpha_2,S1,S2), \ldots Vg_1(\alpha_n,S1,S2)]),$$

$$J(Vs/Vp,Vp,d,\{\rho_f,V_f\},[f0,Q])) \quad (12)$$

Where the index 3n+2 is the resulting number of measured quantities for this case with 3n elements of H and 2 measurements [f0,Q] from the pulse-echo technique and J is an additional prediction function of the casing compressional-wave velocity ratio Vs/Vp, the fluid density d, fluid velocity $\{p_f,V_f\}$, and a number of control variables such as casing density).

Thus, the parameters to be optimized by the combined functions G and J may include the Vs/Vp ratio, the casing compressional-wave velocity Vp, the casing thickness d, the fluid density ρ$_f$ and fluid velocity V$_f$. Some parameters may not be subject to variation in the minimization algorithm. Here again, the a priori known model control variables include the transducer pulse parameters such as bandwidth, central firing frequency, transducer geometry, and transducer position.

A minimization algorithm may be applied to the joint vectorial prediction function H and the measurements p(α$_i$, Sj), Vg(α$_n$,S1,S2), and [f0,Q]. The objective of the minimization algorithm is to find the closed correspondence between the measurements and the function H by an appropriate choice of the Vs/Vp ratio, the casing compressional-wave velocity Vp, the casing thickness d, the fluid density ρ$_f$ and fluid velocity V$_f$, as illustrated below in Equation 13:

$$\text{Min}_{\{(Vs/Vp)^*,Vp^*,d^*,\rho_f^*,V_f^*\}}\|[M_1,M_2, \ldots M_{3n+2}]-[H_1,H_2, \ldots H_{3n+2}]\|^2 \leq \varepsilon \quad (13)$$

Where ε>0 is a sufficiently small value of tolerance and M is the vector of measured quantities described by Equation 14 below:

$$M=[p(\alpha_1,S1),p(\alpha_2,S1), \ldots p(\alpha_n,S1)$$

$$p(\alpha_1,S2),p(\alpha_2,S2), \ldots p(\alpha_n,S2),$$

$$Vg_1(\alpha_1,S1,S2),Vg_1(\alpha_2,S1,S2), \ldots Vg_1(\alpha_n,S1,S2),$$

$$f0,Q] \quad (14)$$

Figure 5:
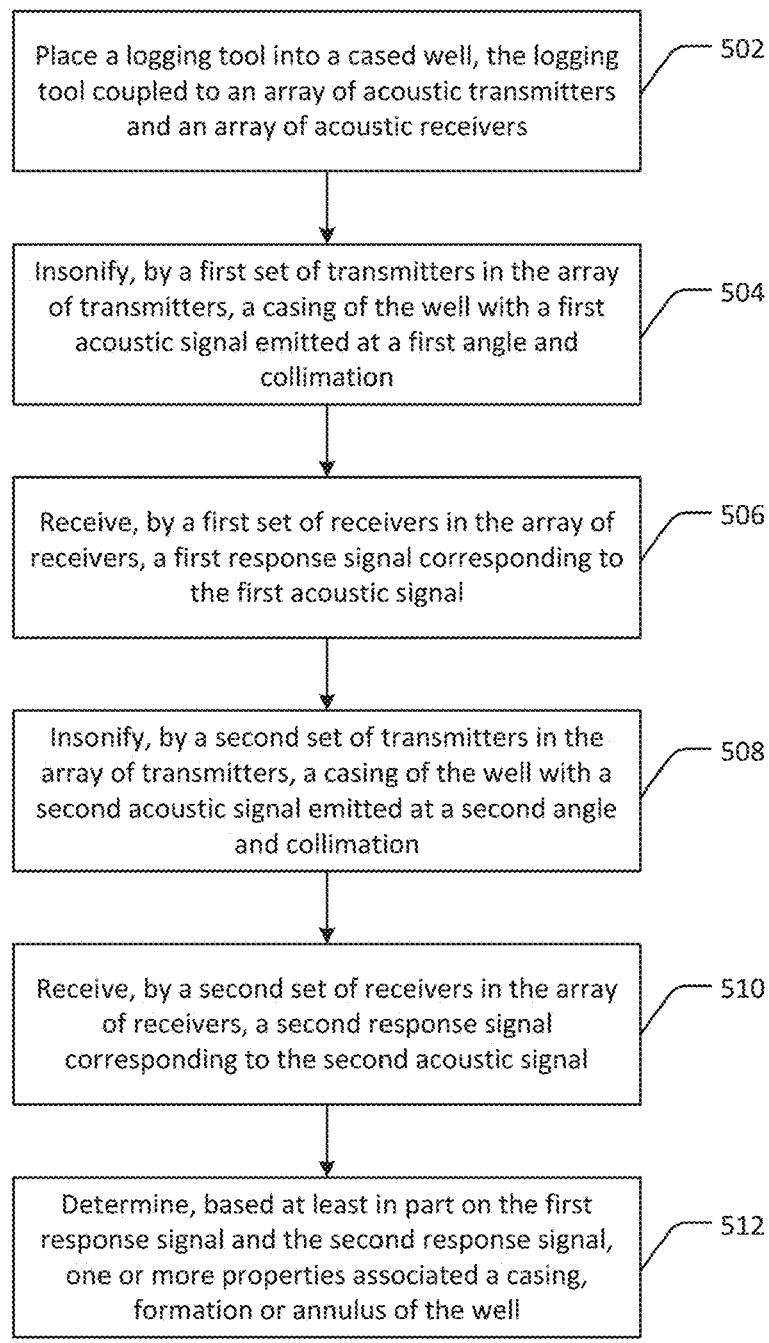
FIG. 5 is a block diagram of a process for beamforming acoustic beams transmitted and detected using phased arrays of a logging tool in accordance with one or more example embodiments.

FIG. 5 depicts a process 500 for beamforming acoustic beams transmitted and detected using phased arrays of a logging tool in accordance with an embodiment of the disclosure. Initially, a logging tool coupled to an array of acoustic transmitters and an array of acoustic receivers may be placed into a cased well (block 502). As noted above, the logging tool may include one or more phased arrays that enable the independent pulsing of transducer elements to beamform a transmitted acoustic beam.

Next, a casing of the well may be insonified with a first acoustic signal emitted at a first angle and a first collimation by a first set of transmitters in the array of transmitters (block 504). Beamforming the first acoustic signal, e.g., steering (e.g., selection of the first angle) and collimating the acoustic signal, may be performed via pulsing of the individual array elements at an appropriately selected delay relative to a reference time zero. In some embodiments, the collimation and direction (as identified by the acoustic angle) of the acoustic beam may be selected based on an excitation frequency, tube geometry (e.g., thickness, diameter, etc.), fluid properties, cement properties (e.g., attenuation, acoustic impedance, etc.), or any combination thereof. In some embodiments, the beamforming may be actively performed (e.g., in real-time) to track desirable measurement modes by using a feedback loop which affects the phased array delay timing and pulse spectrum. A first response signal corresponding to the first acoustic signal (and resulting from Lamb modes excited in the casing by the first acoustic signal) may be received by a first set of receivers in the array of receivers (block 506).

Next, the casing of the well may be insonified with a second acoustic signal emitted at a second angle and a second collimation by a second set of transmitters in the transmitter array (block 508). In some embodiments, the second set of transmitters may be identical to or different form the first set of transformers. Here again, beamforming the second acoustic signal, e.g., steering (e.g., selection of the first angle) and collimating the acoustic signal, may be performed via pulsing of the individual array elements at an appropriately selected delay relative to a reference time zero. In some embodiments, the collimation and direction (as identified by the acoustic angle) of the acoustic beam may be selected based on an excitation frequency, tube geometry (e.g., thickness, diameter, etc.), fluid properties, cement properties (e.g., attenuation, acoustic impedance, etc.), or any combination thereof. In some embodiments, the beamforming may be actively performed (e.g., in real-time). A second response signal corresponding to the second acoustic signal (and resulting from Lamb modes excited in the casing by the first acoustic signal) may be received by a second set of receivers in the receiver array (block 510).

Next, one or more properties associated with the casing, a formation, or an annulus of the well may be determined based at least in part on the first response signal and the second response signal (block 512). For example, in some embodiments the acoustic impedance of material (e.g., cement) behind a casing may be determined. In some embodiments, the thickness of casing may be determined. In yet other embodiments, the casing corrosion may be determined.

Figure 6:
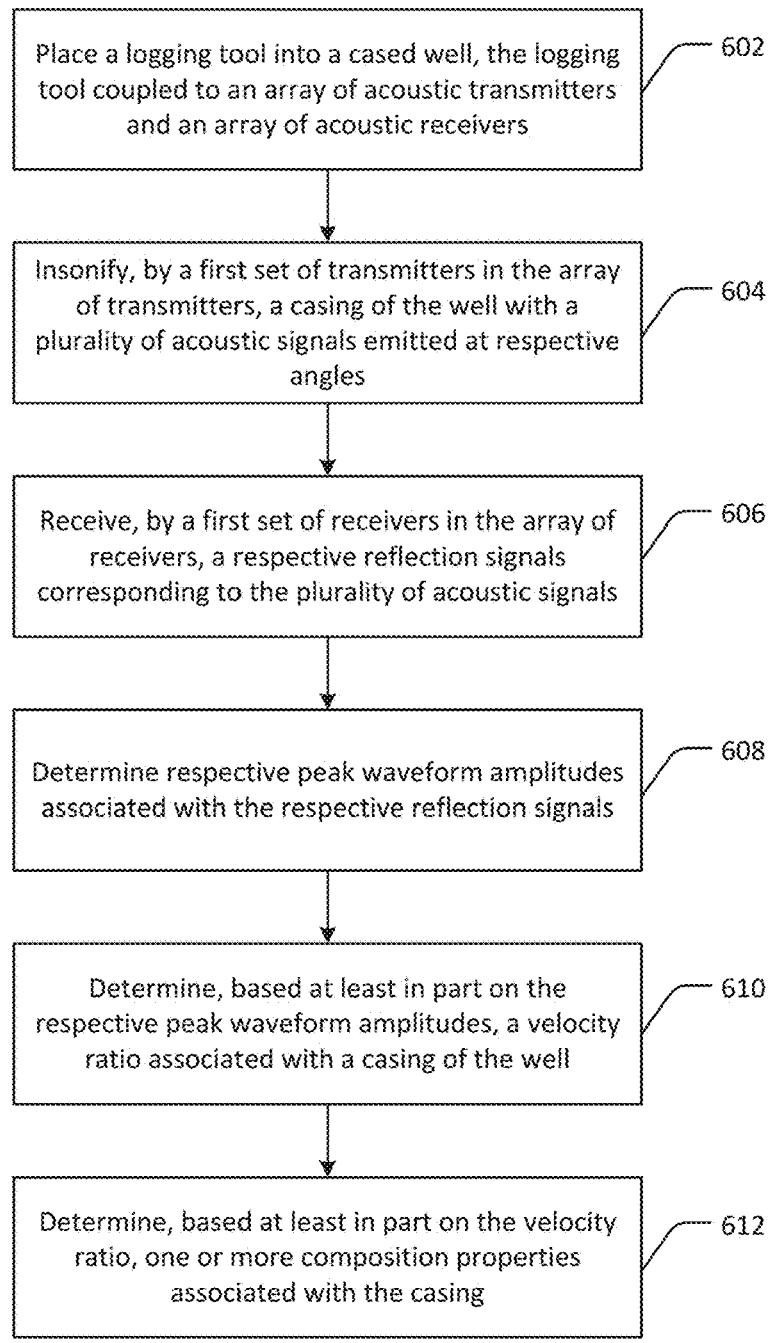
FIG. 6 is a block diagram of a process for acoustically measuring the ratio of shear-wave velocity to compressional-wave velocity using phase arrays of a logging tool in accordance with one or more example embodiments.

FIG. 6 depicts a process 600 for acoustically measuring the ratio of shear-wave velocity to compressional-wave velocity using phase arrays of a logging tool in accordance with an embodiment of the disclosure. Initially, a logging tool coupled to an array of acoustic transmitters and an array of acoustic receivers may be placed into a cased well (block 602). In some embodiments, for example, one, two, three, four, or more arrays of receivers may be used with one or more transmitter arrays.

Next, a casing of the well may be insonified with a plurality of acoustic signals emitted at respective emission angles by a first set of transmitters in the array of transmitters (block 604). As noted above, steering (e.g., selection of the emission angles) of the plurality of acoustic signals may be performed via pulsing of the individual array elements at an appropriately selected delay relative to a reference time zero.

Next, respective reflection signals (e.g., waveforms) corresponding to the plurality of acoustic signals (and resulting from Lamb modes excited in the casing and other materials by the plurality of acoustic signals) may be received at reception angles by a first set of receivers in the receiver array (block 606). In some embodiments, as noted above, the emission angle and reception angles (also referred to as incidence angles) may be equal.

Next, respective peak waveform amplitudes associated with the respective reflection signals (e.g., waveforms) may be determined (block 608) using the techniques described above. Based at least in part on the respective peak waveform amplitudes, a shear-wave velocity to compressional-wave velocity ratio (Vs/Vp) associated with a casing of the well may be determined (block 610). As described above, the shear-wave velocity to compressional-wave velocity ratio (Vs/Vp) may be determined using a variety of techniques, such as using the peak amplitude from measurements over a suitable incidence angle range, using a plurality of angular scans at a minimum of two receiver array spacings and the associated group velocities from the distinct spacings, or combining the peak amplitude and group velocity from pitch-catch measurements may be with pulse-echo measurements. In some embodiments, a shear-wave velocity to compressional-wave ratio (Vs/Vp) may be determined by averaging shear-wave velocity to compressional-wave velocity ratios determined using two or more of the techniques described above.

As shown in FIG. 6, one or more composition properties associated with the casing may be determined based at least in part on the velocity ratio (block 612). For example, in some embodiments the acoustic impedance of material (e.g., cement) behind a casing may be determined. In some embodiments, the thickness of casing may be determined. In yet other embodiments, the casing corrosion may be determined.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed. It will be understood that some or all of the blocks of the block diagrams and flow diagrams, and combinations of blocks in the block diagrams and flow diagrams, respectively, can be implemented by computer-executable program instructions.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements to be performed on the computer or other programmable apparatus to produce a computer-implemented process such that the instructions that execute on the computer or other programmable apparatus provide elements or operations for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way used for one or more implementations or that one or more implementations necessarily include logic for deciding, with or without user input or prompting, whether these features, elements, and/or operations are included or are to be performed in any particular implementation.

Many modifications and other implementations set forth herein will be apparent having the benefit of the teachings presented in the foregoing descriptions and the associated drawings. Therefore, it is to be understood that the systems and methods described herein are not to be limited to the specific implementations disclosed and that modifications and other implementations are intended to be included within the scope of the appended claims. Although specific terms are employed herein, they are used in a generic and descriptive sense and not for purposes of limitation.

The invention claimed is:

1. A method, comprising:
 placing a logging tool into a cased well, the logging tool coupled to an array of acoustic transmitters and an array of acoustic receivers;
 insonifying, by a first set of transmitters of the array of acoustic transmitters, a casing of the well with a plurality of acoustic signals, wherein the plurality of acoustic signals are emitted at respective angles relative to a normal of the casing;
 receiving, by a first set of receivers of the array of acoustic receivers, respective reflection signals corresponding to the plurality of acoustic signals;
 determining, by the logging tool, respective peak waveform amplitudes associated with the respective reflection signals;
 determining, by the logging tool based at least in part on the respective peak amplitudes, a velocity ratio associated with a casing of the cased well, wherein the velocity ratio comprises a ratio of a shear-wave velocity associated with the casing to a compressional-wave velocity associated with the casing; and
 determining, by the logging tool based at least in part on the velocity ratio, a parameter associated with the casing.

2. The method of claim 1, wherein a first acoustic signal of the plurality of acoustic signals is emitted by:
 applying, by the logging tool, respective timing delays to one or more transmitters of the first set of transmitters; and
 generating the first acoustic signal based on respective transmissions of the one or more transmitters according to the respective timing delays.

3. The method of claim 1, wherein the parameter associated with the casing comprises an acoustic impedance.

4. The method of claim 1, wherein the velocity ratio is within a range of approximately 0.50 to 0.58.

5. The method of claim 1, wherein a first acoustic signal of the plurality of acoustic signals comprises an ultrasonic wave signal.

6. The method of claim 1, wherein determining the velocity ratio further comprises:
 determining, based at least in part on the plurality of received reflection signals, an acoustic signal pattern;
 identifying a respective signal pattern associated with each of a plurality of velocity ratios;
 determining that the acoustic signal pattern matches a first respective signal pattern; and
 determining that the first respective signal pattern corresponds to the velocity ratio.

7. The method of claim 1, wherein determining, by the logging tool based at least in part on the velocity ratio, a parameter associated with the casing further comprises:
 determining an impedance measurement associated with the casing based at least in part on the velocity ratio.

8. A non-transitory computer-readable medium storing computer-executable instructions, that when executed by at least one processor, causes the at least one processor to perform the following:
 insonifying, by a first set of transmitters of an array of acoustic transmitters, a casing of a well with a plurality of acoustic signals, wherein the plurality of acoustic signals are emitted at respective angles relative to a normal of the casing;
 receiving, by a first set of receivers of an array of acoustic receivers, respective reflection signals corresponding to the plurality of acoustic signals;
 determining, by the logging tool, respective peak waveform amplitudes associated with the respective reflection signals;
 determining, by the logging tool based at least in part on the respective peak amplitudes, a velocity ratio associated with a casing of the cased well, wherein the velocity ratio comprises a ratio of a shear-wave velocity associated with the casing to a compressional-wave velocity associated with the casing; and
 determining, by the logging tool based at least in part on the velocity ratio, a parameter associated with the casing.

9. The computer-readable medium of claim 8, wherein a first acoustic signal of the plurality of acoustic signals is emitted by:
 applying, by the logging tool, respective timing delays to one or more transmitters of the first set of transmitters; and
 generating the first acoustic signal based on respective transmissions of the one or more transmitters according to the respective timing delays.

10. The computer-readable medium of claim 8, wherein the parameter associated with the casing comprises an acoustic impedance.

11. The computer-readable medium of claim 8, wherein the velocity ratio is within a range of approximately 0.50 to 0.58.

12. The computer-readable medium of claim 8, wherein a first acoustic signal of the plurality of acoustic signals comprises an ultrasonic wave signal.

13. The computer-readable medium of claim 8, wherein determining the velocity ratio further comprises:
- determining, based at least in part on the plurality of received reflection signals, an acoustic signal pattern;
- identifying a respective signal pattern associated with each of a plurality of velocity ratios;
- determining that the acoustic signal pattern matches a first respective signal pattern; and
- determining that the first respective signal pattern corresponds to the velocity ratio.

14. The computer-readable medium of claim 8, wherein determining, by the logging tool based at least in part on the velocity ratio, a parameter associated with the casing further comprises:
- determining an impedance measurement associated with the casing based at least in part on the velocity ratio.

15. A system, comprising:
- at least one processor:
- at least one memory storing computer-executable instructions, that when executed by at least one processor, causes the at least one processor to perform the following:
  - insonifying, by a first set of transmitters of an array of acoustic transmitters, a casing of a well with a plurality of acoustic signals, wherein the plurality of acoustic signals are emitted at respective angles relative to a normal of the casing;
  - receiving, by a first set of receivers of an array of acoustic receivers, respective reflection signals corresponding to the plurality of acoustic signals;
  - determining, by the logging tool, respective peak waveform amplitudes associated with the respective reflection signals;
  - determining, by the logging tool based at least in part on the respective peak amplitudes, a velocity ratio associated with a casing of the cased well, wherein the velocity ratio comprises a ratio of a shear-wave velocity associated with the casing to a compressional-wave velocity associated with the casing; and
  - determining, by the logging tool based at least in part on the velocity ratio, a parameter associated with the casing.

16. The system of claim 15, wherein a first acoustic signal of the plurality of acoustic signals is emitted by:
- applying, by the logging tool, respective timing delays to one or more transmitters of the first set of transmitters; and
- generating the first acoustic signal based on respective transmissions of the one or more transmitters according to the respective timing delays.

17. The system of claim 15, wherein the parameter associated with the casing comprises an acoustic impedance.

18. The system of claim 15, wherein the velocity ratio is within a range of approximately 0.50 to 0.58.

19. The system of claim 15, wherein determining the velocity ratio further comprises:
- determining, based at least in part on the plurality of received reflection signals, an acoustic signal pattern;
- identifying a respective signal pattern associated with each of a plurality of velocity ratios;
- determining that the acoustic signal pattern matches a first respective signal pattern of the respective signal patterns; and
- determining that the first respective signal pattern corresponds to the velocity ratio.

20. The system of claim 15, wherein determining, by the logging tool based at least in part on the velocity ratio, a parameter associated with the casing further comprises:
- determining an impedance measurement associated with the casing based at least in part on the velocity ratio.

* * * * *